No. 896,165. PATENTED AUG. 18, 1908.
O. SELG.
FAN.
APPLICATION FILED APR. 16, 1908.
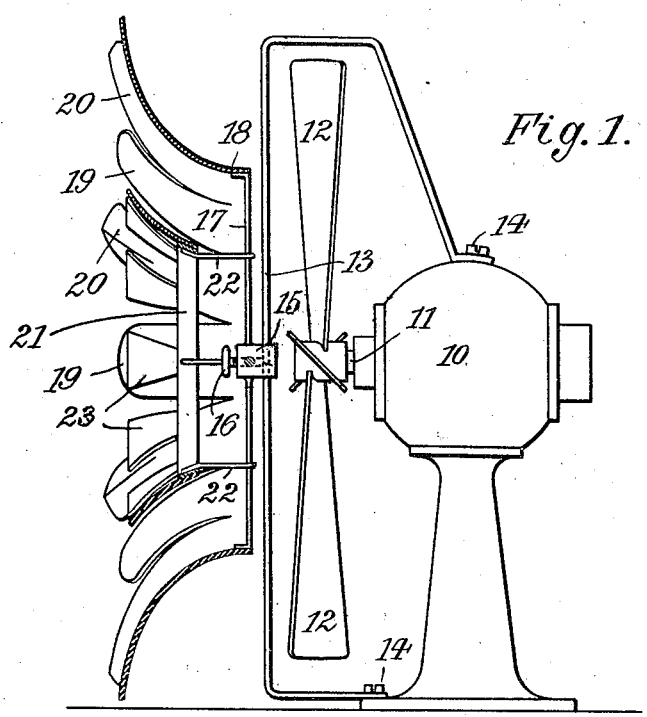
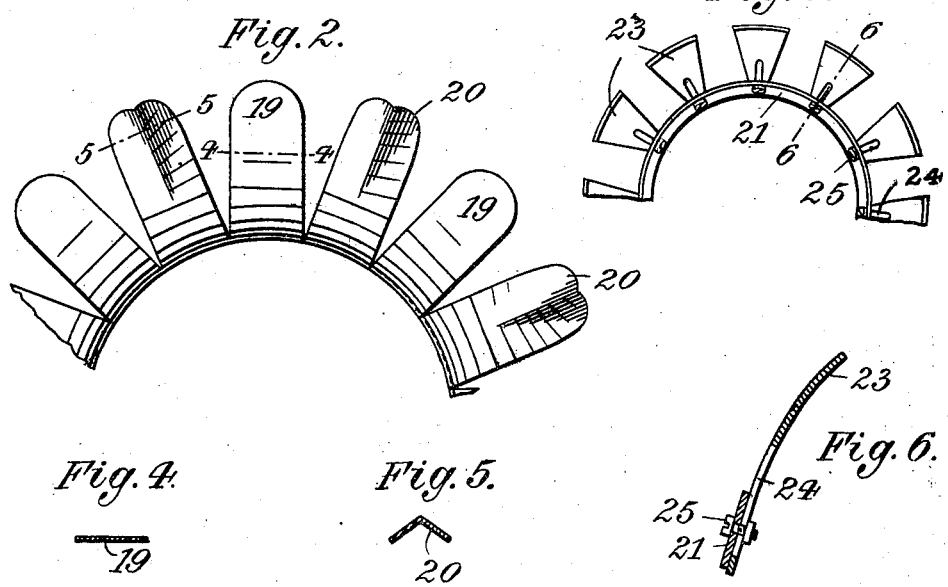

UNITED STATES PATENT OFFICE.

OTTO SELG, OF NEW YORK, N. Y.

FAN.

No. 896,165.    Specification of Letters Patent.    Patented Aug. 18, 1908.

Application filed April 16, 1908. Serial No. 427,311.

*To all whom it may concern:*

Be it known that I, OTTO SELG, a citizen of the United States, residing at New York city, Manhattan, county and State of New York, have invented new and useful Improvements in Fans, of which the following is a specification.

This invention relates to a fan provided with novel and effective means for distributing the blast over an extensive area.

In the accompanying drawing: Figure 1 is a side elevation, partly in section, of my improved fan; Fig. 2 a detail of part of the outer deflector; Fig. 3 a similar view of the inner deflector; Fig. 4 a cross section on line 4—4, Fig. 2; Fig. 5 a cross section on line 5—5, Fig. 2, and Fig. 6 a cross section on line 6—6, Fig. 3.

In the housing 10 of an electric fan turns the shaft 11 of the wind vanes 12, as usual. Centered in front of the housing is an upright rod 13 secured thereto by screws 14. Rod 13 is embraced by a socket 15 held thereto by a clamp-screw 16. To this socket is secured a cruciform frame 17 extending through an annular outer deflector 18. This deflector is made in the shape of a belled ring which is slitted transversely at intervals from its front to within a suitable distance from its back. In this way there are formed, integral with the ring, a series of curved blades 19, 20, which are bent outwardly, so as to diverge towards their free edge. Of these, blades 19, which alternate with blades 20, are made straight in cross section, (Fig. 4), while blades 20 are made V-shaped in cross section at their forward ends, (Fig. 5). Thus, while blades 19 will diffuse the air in wide strata, blades 20 will deflect it in concentrated radial currents that alternate with such strata. In this way a wide spreading of the air, and an effective cooling action will be obtained.

Within the first or outer deflector 18 is contained a second or inner deflector. This inner deflector is composed of a ring 21 to which a series of flaring blades 23 are secured. The inner deflector is so spaced from outer deflector 18, that an annular air passage is formed between them. Ring 21 is held concentrically to deflector 18 by means of a series of rods 22 secured to frame 17.

As shown, blades 23 are slotted as at 24 for the reception of clamp screws 25 engaging ring 21. By setting the blades 23, either backward or forward, the volume and direction of the blasts passing through the inner deflector, and between such inner deflector and the outer deflector, may be readily varied.

I claim:

1. A fan provided with an annular slitted deflector having a series of blades that are V-shaped in cross section, substantially as specified.

2. A fan provided with an annular slitted deflector having a first series of blades that are straight in cross section, and a second series of blades that are V-shaped in cross section, substantially as specified.

3. A fan provided with an outer ring having deflecting blades, an inner concentric ring, and deflecting blades adjustably mounted on the inner ring, substantially as specified.

4. A fan provided with a slitted annular deflector having a series of integral diverging blades, a ring concentric to said deflector, and blades adjustably secured to said ring, substantially as specified.

Signed by me at New York city, (Manhattan,) N. Y., this 15th day of April, 1908.

OTTO SELG.

Witnesses:
FRANK V. BRIESEN,
ARTHUR E. ZUMPE.